US009243654B2

(12) United States Patent
Hayton

(10) Patent No.: US 9,243,654 B2
(45) Date of Patent: Jan. 26, 2016

(54) PANEL ATTACHMENT SYSTEM

(71) Applicant: ROLLS-ROYCE PLC, London (GB)

(72) Inventor: Paul Robert Hayton, Bristol (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 14/337,524

(22) Filed: Jul. 22, 2014

(65) Prior Publication Data

US 2015/0050072 A1    Feb. 19, 2015

(30) Foreign Application Priority Data

Aug. 16, 2013    (GB) .................................. 1314667.5

(51) Int. Cl.
| | |
|---|---|
| *E04B 1/38* | (2006.01) |
| *F16B 5/00* | (2006.01) |
| *F01D 25/28* | (2006.01) |
| *F02K 1/04* | (2006.01) |
| *F02K 1/80* | (2006.01) |
| *F02K 1/82* | (2006.01) |
| *F02C 7/20* | (2006.01) |

(52) U.S. Cl.
CPC . *F16B 5/00* (2013.01); *F01D 25/28* (2013.01); *F02C 7/20* (2013.01); *F02K 1/04* (2013.01); *F02K 1/80* (2013.01); *F02K 1/82* (2013.01); *F05D 2230/54* (2013.01); *F05D 2250/18* (2013.01); *F05D 2300/5021* (2013.01); *Y10T 403/32951* (2015.01)

(58) Field of Classification Search
CPC ............. B64D 27/26; F02C 7/20; F16B 5/00; F01D 25/28
USPC ................................................ 52/511, 506.01
See application file for complete search history.

(56) References Cited

U.S. PATENT DOCUMENTS

| | | | | |
|---|---|---|---|---|
| 3,295,764 A | * | 1/1967 | Geary et al. ............. | 239/265.41 |
| 3,807,637 A | * | 4/1974 | Camboulives et al. .. | 239/265.41 |
| 4,571,936 A | * | 2/1986 | Nash et al. ....................... | 60/797 |
| 5,277,382 A | * | 1/1994 | Seelen et al. .................... | 244/54 |
| 5,277,860 A | * | 1/1994 | Sinclair .......................... | 264/242 |
| 5,303,880 A | * | 4/1994 | Cencula et al. ................. | 244/54 |
| 5,351,423 A | * | 10/1994 | Vohl ............................... | 37/260 |
| 5,402,605 A | * | 4/1995 | Paules ............................ | 451/157 |

(Continued)

FOREIGN PATENT DOCUMENTS

| | | |
|---|---|---|
| EP | 0 557 229 A1 | 8/1993 |
| EP | 0741074 A1 | 11/1996 |

(Continued)

OTHER PUBLICATIONS

Dec. 10, 2014 European Search Report issued in Application No. EP 14 17 7939.

(Continued)

*Primary Examiner* — Basil Katcheves
(74) *Attorney, Agent, or Firm* — Oliff PLC

(57) ABSTRACT

A panel attachment device for removably connecting a panel to a casing comprises a first bracket, a second bracket, and a link. The link has a first end and an opposite second end, with the first end being removably connected to the first bracket and the second end being removably connected to the second bracket. Each of the first end and second ends is located by, and rotatable relative to, the first bracket and second bracket respectively to thereby constrain the panel relative to the casing.

7 Claims, 3 Drawing Sheets

(56) References Cited

U.S. PATENT DOCUMENTS

| | | | | |
|---|---|---|---|---|
| 5,460,487 | A * | 10/1995 | Schmaling et al. | 416/134 A |
| 5,649,417 | A * | 7/1997 | Hey | 60/797 |
| 5,689,435 | A | 11/1997 | Umney et al. | |
| 5,781,989 | A * | 7/1998 | Schmidt | 29/787 |
| 5,782,078 | A * | 7/1998 | Brantley | 60/797 |
| 6,170,252 | B1 * | 1/2001 | Van Duyn | 60/796 |
| 6,174,210 | B1 * | 1/2001 | Spade et al. | 440/41 |
| 6,212,974 | B1 * | 4/2001 | Van Duyn | 74/606 R |
| 8,683,964 | B2 * | 4/2014 | Van Rooyen | 123/65 V |
| 8,689,674 | B2 * | 4/2014 | Duke et al. | 92/12.2 |
| 2007/0031247 | A1 | 2/2007 | Spitzer et al. | |
| 2009/0077978 | A1 | 3/2009 | Figueroa et al. | |
| 2009/0252443 | A1 * | 10/2009 | Gaumer | 384/322 |
| 2009/0293498 | A1 | 12/2009 | Petty et al. | |
| 2009/0317175 | A1 | 12/2009 | Martinez | |
| 2010/0021094 | A1 * | 1/2010 | Kaufman et al. | 384/209 |
| 2010/0047010 | A1 * | 2/2010 | Halcom et al. | 403/149 |
| 2010/0055383 | A1 * | 3/2010 | Schalla et al. | 428/99 |

FOREIGN PATENT DOCUMENTS

| | | |
|---|---|---|
| GB | 1 484 484 | 9/1977 |
| GB | 2141492 A | 12/1984 |
| GB | 2490781 A | 11/2012 |

OTHER PUBLICATIONS

Search Report issued in British Patent Application No. 1314667.5 dated Mar. 17, 2014.

\* cited by examiner

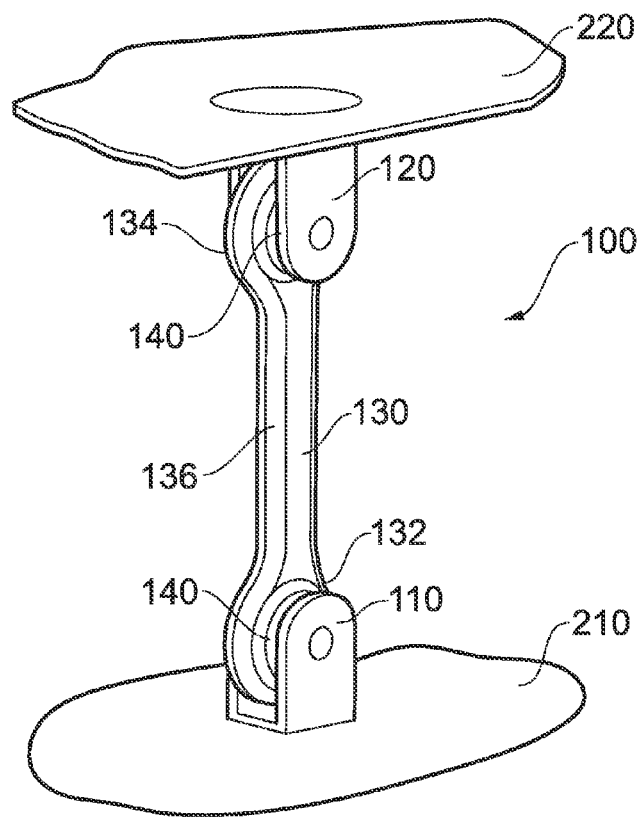
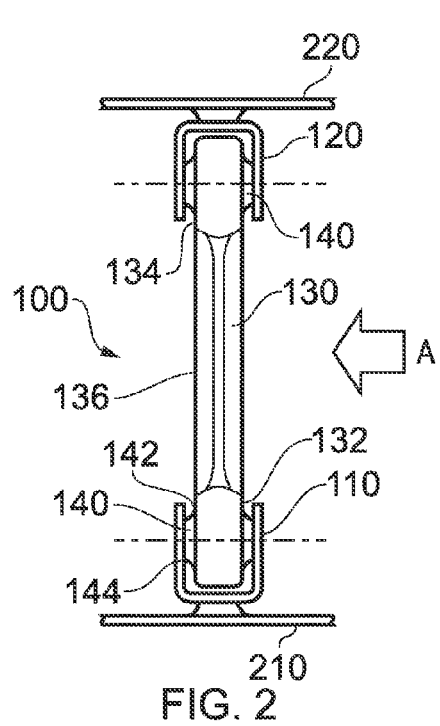
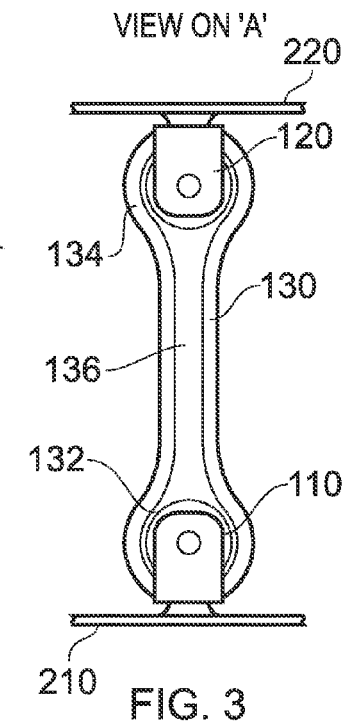

PANEL ATTACHMENT SYSTEM

This invention claims the benefit of UK Patent Application No. GB1314667.5, filed on 16 Aug. 2013, which is incorporated herein in its entirety.

FIELD OF THE INVENTION

The present invention relates to a panel attachment system and particularly, but not exclusively, to a panel attachment system for an exhaust gas duct.

BACKGROUND TO THE INVENTION

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth of the exhaust duct resulting from thermal expansion of the duct. Such mounting arrangements are required to accommodate movement of the duct both axially and laterally and can be mechanically complicated.

STATEMENTS OF INVENTION

According to a first aspect of the present invention there is provided a panel attachment device for removably connecting a panel to a casing, the panel attachment device comprising:
a first bracket;
a second bracket; and
a link having a first end and an opposite second end,
wherein the first end is removably connected to the first bracket and the second end is removably connected to the second bracket, each of the first end and second end being located by, and rotatable relative to, the first bracket and second bracket respectively.

The relative rotation between the first bracket and the second bracket enables the panel attachment device to maintain a desired predetermined spacing between panel and casing without transmitting bending loads into the link. This allows the link to be sized to withstand only axial loads thus enabling the weight of the attachment device to be reduced so making the device more efficient and attractive to a user.

Optionally, the link is an elongate member.

The link may be formed with a length to suit a particular panel to casing spacing by simply varying the distance between the first end and the second end.

Optionally, each of the first end and second end comprises a spherical bearing, the outer diameter of each spherical bearing being fixedly connected to a corresponding one of the first and second ends, the inner diameter of each spherical bearing being fixedly connected to a corresponding one of the first and second brackets, the axis of each spherical bearing being coincident with one another.

A spherical bearing allows for relative rotation between respective ones of the first and second brackets and corresponding first and second ends of the link both in the plane of the link (i.e. fore/aft) and across the plane of the link (i.e. side to side). This makes the attachment device more convenient and capable of handling a wide variety of small relative displacements between the first and second brackets and corresponding first and second ends of the link.

Optionally, the link comprises a centre portion interposed between the first end and the second end, a lateral cross-sectional area of the centre portion being smaller than a lateral cross-sectional area of the first end and the second end.

Optionally, each of the first bracket, second bracket and link is formed from a sheet metal or a sheet metal alloy.

The use of sheet metal enables the first and second brackets and the link to be produced at low cost and because, as outlined above, these parts need only withstand axial loads they can be structurally efficient.

Optionally, a cross-section of the centre portion is streamlined in a plane substantially normal to the axis of each of the spherical bearings.

It is common practice for a cooling air flow to be circulated in the space between the panel and the casing. Since the link is positioned in this space it can reduce the flow efficiency of this cooling air flow. Consequently it is desirable to streamline the centre portion of the link so as to minimise any disruption to the cooling air flow passing over the link.

According to a second aspect of the present invention there is provided a panel attachment system comprising:
a panel;
a casing;
a centre mount; and
a plurality of panel attachment devices as defined by the first embodiment of the invention,
the centre mount fixedly connecting the panel and the casing, each of the first brackets being fixedly connected to the panel, and each of the second brackets being fixedly connected to the casing, such that each of the spherical bearing axes is parallel to each other.

The use of a plurality of panel attachment assemblies enables a panel to be attached to a casing while accommodating any thermal growth of the panel and still maintaining the positional arrangement of the panel and casing.

A single fixed mount is positioned so that the thermal growth of the panel occurs in directions that are predictable and optimum for the particular design.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 1 shows a perspective view of a panel attachment device according to a first embodiment of the invention;

FIG. 2 shows an end view of the attachment device of FIG. 1;

FIG. 3 shows an elevational view of the attachment device of FIG. 1;

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 4:
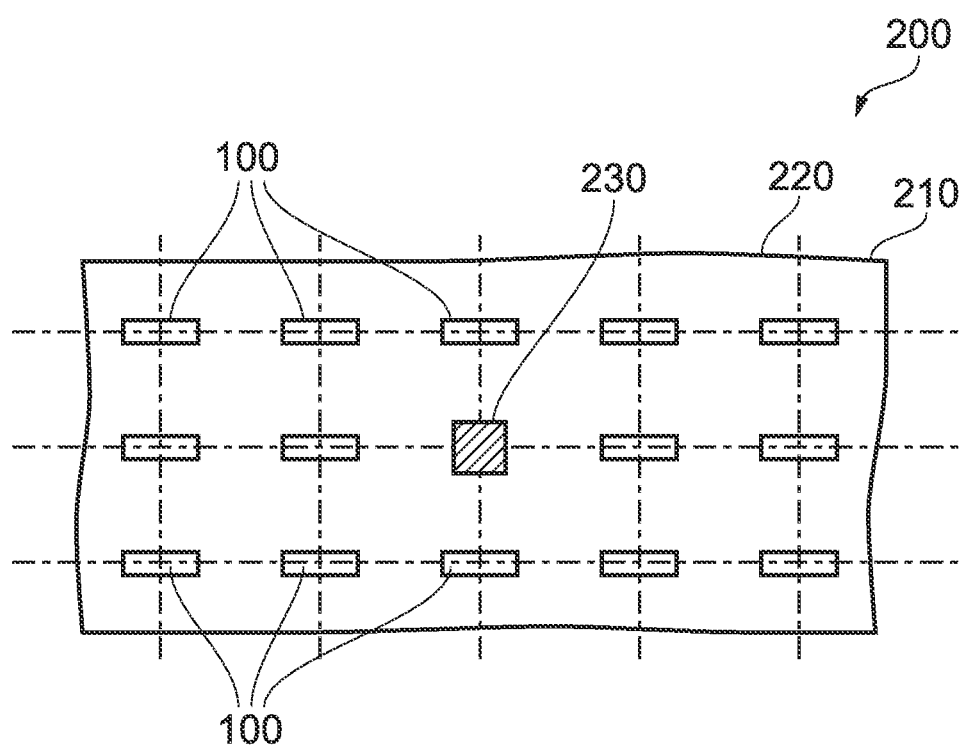
FIG. 4 is a schematic plan view of panel attachment system according to a second embodiment of the invention.

Referring to FIGS. 1 to 3, a panel attachment device according to a first embodiment of the invention is designated generally by the reference numeral 100. The panel attachment device 100 removably connects a panel 210 to a casing 220 of an exhaust system (not shown) for a gas turbine engine (not shown)

The panel attachment device 100 comprises a first bracket 110, a second bracket 120 and a link 130.

The first bracket 110 is fixedly connected to the panel 210 while the second bracket 120 is fixedly connected to the opposing casing 220. In the present arrangement each of the first and second brackets 110,120 are formed from sheet metal pressings. In alternative arrangements, the first and second brackets 110,120 may be formed from a fibre reinforced material, such as a carbon fibre reinforced composite material.

The link 130 is formed from sheet metal and comprises a first end 132, a second end 134 and a centre portion 136. The link 130 has a 'dog bone' profile with a cross-sectional area 137 of the centre portion 136 being smaller than a cross-sectional area 133,135 of the first and second ends 132,134.

The centre portion 136 is formed with a generally rectangular cross-sectional area. The width sides of the rectangular cross-section are streamlined in order to minimise the disruption they produce on an air flow (shown as 'A' in FIG. 2) passing over the centre portion 136.

Each of the first end 132 and second end 134 has a hole therethrough to accommodate a spherical bearing 140. An outer diameter 142 of the spherical bearing 140 is fixedly connected to the first end 132 and the second end 134 of the link 130. An inner diameter 144 of the spherical bearing 140 is fixedly connected to respective ones of the first and second brackets 110,120.

In this way, any relative movement between the link 130 and each of the first and second brackets 110,120 can be readily accommodated by the spherical bearing 140 movement.

Figure 5:
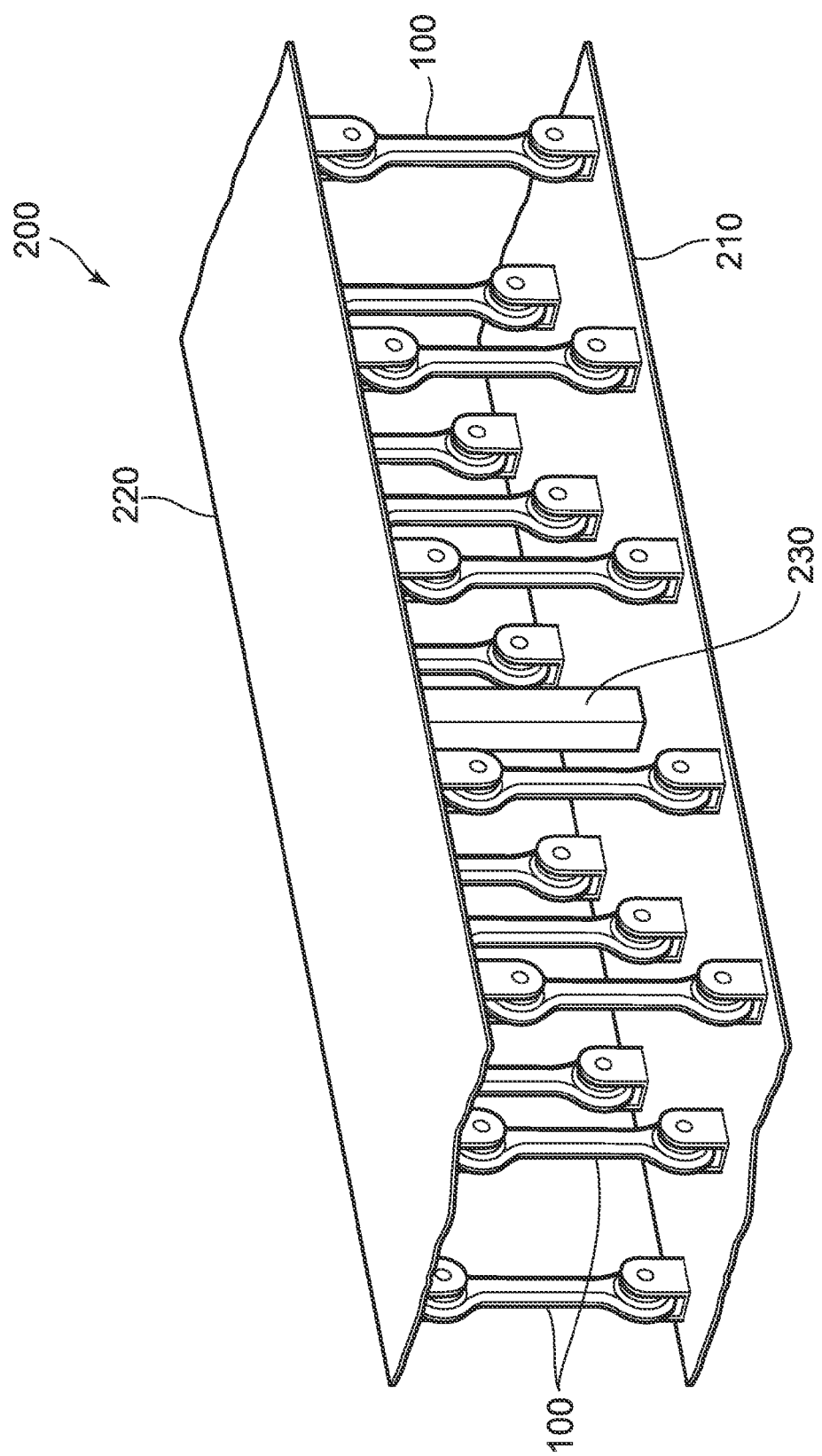
FIG. 5 is a schematic perspective view of the panel attachment system according to the second embodiment of the invention.

Referring to FIGS. 4 and 5, a panel attachment system according to a second embodiment of the invention is designated generally by the reference numeral 200. Features of the panel attachment system 200 which correspond to those of panel attachment device 100 have been given corresponding reference numerals for ease of reference.

The panel attachment system 200 has a panel 210 that is spaced apart from a casing 220. A single fixed mount 230 fixedly connects the panel 210 and the casing 220. A plurality of panel attachment devices 100 are then arranged across the surface of the casing 220, and the panel 210.

The panel attachment devices 100 are arranged row-wise across the panel/casing surface with each of the links 130 arranged so that they each lie in the same plane or in parallel planes. This ensures that any lateral and longitudinal movement of the panel 210 relative to the casing 220 resulting from thermal growth of the panel 210 can readily be accommodated by relative movement between the first and second ends of the link 132,134 and respective ones of the first and second brackets 110,120.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A gas turbine engine exhaust panel attachment system, comprising:
   a panel;
   a casing substantially parallel to the panel;
   a centre mount fixedly connecting the panel and the casing so as to maintain the positional arrangement of the panel and the casing by preventing all relative movement between the panel and the casing at the centre mount; and
   a plurality of panel attachment devices, each of the panel attachment devices comprising:
      a first bracket;
      a second bracket; and
      a link having a first end and an opposite second end, the first end being removably connected to the first bracket, the second end being removably connected to the second bracket, and each of the first end and the second end being located by, and rotatable relative to, the first bracket and the second bracket, respectively, wherein:
   each of the first brackets of the plurality of panel attachment devices is fixedly connected to the panel, and
   each of the second brackets of the plurality of panel attachment devices is fixedly connected to the casing.

2. The gas turbine engine exhaust panel attachment system as claimed in claim 1, wherein the link is an elongate member.

3. The gas turbine engine exhaust panel attachment system as claimed in claim 1, wherein each of the first end and the second end comprises a spherical bearing, the outer diameter of each spherical bearing being fixedly connected to a corresponding one of the first and second ends, the inner diameter of each spherical bearing being fixedly connected to a corresponding one of the first and second brackets, and the axes of the spherical bearings being coincident with one another.

4. The gas turbine engine exhaust panel attachment system as claimed in claim 3, wherein the link comprises a centre portion interposed between the first end and the second end, a lateral cross-sectional area of the centre portion being smaller than a lateral cross-sectional area of the first end and the second end.

5. The gas turbine engine exhaust panel attachment system as claimed in claim 4, wherein a cross-section of the centre portion is streamlined in a plane substantially normal to the axis of each of the spherical bearings.

6. A gas turbine engine exhaust panel attachment system as claimed in claim 3, wherein the spherical bearing axes are parallel to each other.

7. The gas turbine engine exhaust panel attachment system as claimed in claim 1, wherein each of the first bracket, the second bracket, and the link is formed from a sheet metal or a sheet metal alloy.

* * * * *